UNITED STATES PATENT OFFICE.

MELCHIOR BÖNIGER, OF BASEL, SWITZERLAND, ASSIGNOR TO CHEMISCHE FABRIK VORMALS SANDOZ, OF BASEL, SWITZERLAND, A CORPORATION OF SWITZERLAND.

RED MONOAZO DYESTUFFS.

1,014,114.  Specification of Letters Patent.  Patented Jan. 9, 1912.

No Drawing.   Application filed June 8, 1911. Serial No. 631,893.

*To all whom it may concern:*

Be it known that I, MELCHIOR BÖNIGER, a citizen of the Swiss Republic, residing in Basel, Switzerland, have invented new and useful Improvements in the manufacture of Red Monoazo Dyestuffs, of which the following is a specification.

My invention relates to the manufacture of red monoazo dyestuffs by brominating naphthalene-1-diazo-2-oxid-4-sulfonic acid, and combining the resulting monobromnaphthalene-1-diazo-2-oxid-4-sulfonic acid with 1-aryl-3-methyl-5-pyrazalones.

Hitherto aromatic diazo compounds could not be brominated in the aromatic nucleus without decomposition or transformation of the diazo group, superbromids of the diazo compounds being generally formed in the first phase of the reaction. Now I have found that by avoiding the presence of water, the especially stable naphthalene-1-diazo-2-oxid-4-sulfonic acid, treated under suitable conditions with bromin, is transformed with nearly theoretical yield into a new monobromnaphthalene-1-diazo-2-oxid-4-sulfonic acid, which combined with 1-aryl-3-methyl-5-pyrazolones or 1-sulfoaryl-3-methyl-5-pyrazolones yields very valuable orthooxy azo dyes, distinguished by a more bloomy and a bluer shade of their afterchromed red dyeings than those of the analogous nonbrominated azo dyestuffs.

In carrying out my process practically, I proceed as follows:—Add to the solution of 150 kilos of sharply dried naphthalene-1-diazo-2-oxid-4-sulfonic acid in 300 kilos of chlorsulfonic acid, 70 kilos of bromin and heat the mixture in a reflux apparatus slowly up to 55–60° C., stir at this temperature for about ten hours. A constant current of hydrogen bromid and sulfurous acid is evolved, the latter being formed by a secondary reaction of hydrogen bromid and chlorsulfonic acid, whereby bromin is regenerated. Complete bromination can therefore in fact be effected by less than the theoretical quantities of bromin. The excess of bromin is finally blown away by a current of air and the blackish green-yellow colored solution is, after cooling, poured into 2000 liters of ice-water. The bromnaphthalene-1-diazo-2-oxid-4-sulfonic acid precipitates as a greenish-yellow powder, which when filtered off and stirred once more with 1000 liters of water and drained therefrom again, can be directly used for the combination with chromogenes as, for instance, the pyrazolones. For purification this raw product can be dissolved in water at 75° C. and precipitated after filtration by addition of hydrochloric acid. Small greenish-yellow needles are thus obtained, which are shown by analysis to be monobromnaphthalene-diazoxid-sulfonic acid. Heated in a capillary tube the substance decomposes at about 180° C. It dissolves easily in diluted acetates of alkalis and also in diluted alkalis and their carbonates to form yellow colored solutions and it can be precipitated from such solutions by addition of mineral acids. The same monobromnaphthalene-diazoxidsulfonic acid can also be obtained by treating with bromin at temperatures between 50 and 90° C. naphthalene-1-diazo-2-oxid-4-sulfonic acid dissolved in strong sulfuric acid, monohydrate or weakly fuming sulfuric acid and in presence of a halogen carrier such as iodin.

The bromnaphthalene-1-diazo-2-oxid-4-sulfonic acid obtained according to the foregoing indications from 150 kilos of naphthalene-1-diazo-2-oxid-4-sulfonic acid, corresponding to about 160 kilos of pure monobromnaphthalene-1-diazo-2-oxid-4-sulfonic acid is dissolved at 15° C. in 1600 liters of water by addition of 160 kilos of Solvay soda and then mixed with the solution of 92 kilos of 1-phenyl-3-methyl-5-pyrazolone in 800 liters of water and 64 kilos of 33% caustic soda lye. The combination sets in immediately and is completed in about 24 hours. The dyestuff is salted out from the reddish brown solution by saturation with common salt, filtered off and dried. It is a dark brown powder, easily soluble in water with a brownish yellow-red color, turning to orange on addition of caustic soda lye, and depositing the sulfonic acid of the dyestuff in brick-red flakes upon addition of mineral acids. In strong sulfuric acid the dyestuffs dissolves with a pure bluish red color. It produces on wool from an acid bath bluish orange shades, which on subsequent treatment with bichromates become blue-red. The same blue-red shades, distinguished by a remarkable fastness to light, milling and potting, are obtained directly in dyeing on chrome mordanted wool.

Similar dyestuffs can be obtained by substituting the 1-phenyl-3-methyl-5-pyrazolone by other 1-aryl-3-methyl-5-pyrazolones or 1-sulfoaryl-3-methyl-5-pyrazolones, being not substituted in the position 4.

By reduction, as for example when boiled with zinc dust in ammoniacal solution, the new dyestuffs are split up, monobrom-1-amino-2-napthtol-4-sulfonic acid and a 4-amino-5-pyrazolone being formed.

Having now described my invention and the manner of performing the same, what I claim is:

1. The process for the manufacture of red monoazo dyestuffs which consists in brominating 1-diazo-2-naphthol-4-sulfonic acid and combining the so obtained monobromnaphthalene-1-diazo-2-oxid-4-sulfonic acid with 1-aryl-3-methyl-5-pyrazolones.

2. An improvement in the manufacture of monoazo dyestuffs consisting in the process for the manufacture of monobromnaphthalene-1-diazo-2-oxid-4-sulfonic acid, by treating with bromin the naphthalene-1-diazo-2-oxid-4-sulfonic acid.

3. An improvement in the manufacture of monoazo dyestuffs, consisting in the process for the manufacture of monobromnaphthalene-1-diazo-2-oxid-4-sulfonic acid, by treating with bromin the naphthalene-1-diazo-2-oxid-4-sulfonic acid dissolved in chlorsulfonic acid.

4. As new products the monoazo dyestuffs derived from monobromnaphthalene-1-diazo-2-oxid-4-sulfonic acid and 1-aryl-3-methyl-5-pyrazolones, dissolving in water with a brownish yellow-red, in strong sulfuric acid with a pure bluish red color, producing on wool from an acid bath orange shades, which on subsequent treatment with bichromates become blue-red.

5. As new product the monoazo dyestuff, derived from monobromnaphthalene-1-diazo-2-oxid-4-sulfonic acid and 1-phenyl-3-methyl-5-pyrazolone, being easily soluble in water with a brownish yellow-red color, turning to orange on addition of caustic soda lye and depositing the sulfonic acid of the dyestuff in brick-red flakes upon addition of mineral acids, dissolving in strong sulfuric acid with a pure blue red color and producing on wool from an acid bath bluish orange shades, which on subsequent treatment with bichromates become blue-red.

In testimony whereof, I have hereunto set my hand in the presence of two subscribing witnesses.

MELCHIOR BÖNIGER.

Witnesses:
WERNER STAUFFACHER,
ARNOLD ZUBER.

---

Copies of this patent may be obtained for five cents each, by addressing the "Commissioner of Patents, Washington, D. C."